United States Patent
Schroeder (10) Patent No.: US 11,193,697 B2
(45) Date of Patent: Dec. 7, 2021

(54) FAN SPEED CONTROL METHOD FOR CALORIC HEAT PUMP SYSTEMS

(71) Applicant: Haier US Appliance Solutions, Inc., Wilmington, DE (US)

(72) Inventor: Michael Goodman Schroeder, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 481 days.

(21) Appl. No.: 16/242,073

(22) Filed: Jan. 8, 2019

(65) Prior Publication Data
US 2020/0217564 A1 Jul. 9, 2020

(51) Int. Cl.
*F25B 21/00* (2006.01)
*F25B 49/00* (2006.01)
*F04D 27/00* (2006.01)

(52) U.S. Cl.
CPC ............ *F25B 21/00* (2013.01); *F04D 27/004* (2013.01); *F25B 49/00* (2013.01); *F25B 2321/002* (2013.01); *F25B 2321/0023* (2013.01); *F25B 2600/11* (2013.01)

(58) Field of Classification Search
CPC .......................... F25B 21/00; F25B 2321/002; F25B 2600/11; F25B 2321/0023; F25B 2321/0022; F04D 27/004
See application file for complete search history.

(56) References Cited

U.S. PATENT DOCUMENTS

| 668,560 A | 2/1901 | Fulner et al. |
| 1,985,455 A | 12/1934 | Mosby |
| 2,671,929 A | 3/1954 | Gayler |
| 2,765,633 A | 10/1956 | Muffly |
| 3,618,265 A | 11/1971 | Croop |
| 3,816,029 A | 6/1974 | Bowen et al. |
| 3,844,341 A | 10/1974 | Bimshas, Jr. et al. |
| 3,956,076 A | 5/1976 | Powell, Jr. et al. |
| 4,037,427 A | 7/1977 | Kramer |
| 4,102,655 A | 7/1978 | Jeffery et al. |

(Continued)

FOREIGN PATENT DOCUMENTS

| CA | 2893874 A1 | 6/2014 |
| CA | 2919117 A1 | 1/2015 |

(Continued)

OTHER PUBLICATIONS

Stefano Dall'Olio, et al., Numerical Simulation of a Tapered Bed AMR, Technical University of Denmark, 2015, 2 pages.

(Continued)

*Primary Examiner* — Frantz F Jules
*Assistant Examiner* — Lionel Nouketcha
(74) *Attorney, Agent, or Firm* — Dority & Manning, P.A.

(57) ABSTRACT

A method for operating a caloric heat pump system includes changing a cycle frequency at which a field of a field generator is applied to caloric material in the caloric heat pump system. The method also includes adjusting a speed of a hot side fan in response to the cycle frequency change and adjusting a speed of a cold side fan in response to the cycle frequency change. A respective one of three separate control loops changes the cycle frequency, adjusts the speed of the hot side fan, and adjusts the speed of the cold side fan.

19 Claims, 5 Drawing Sheets

(56) References Cited

U.S. PATENT DOCUMENTS

| | | |
|---|---|---|
| 4,107,935 A | 8/1978 | Steyert, Jr. |
| 4,197,709 A | 4/1980 | Hochstein |
| 4,200,680 A | 4/1980 | Sasazawa et al. |
| 4,259,843 A | 4/1981 | Kausch |
| 4,332,135 A | 6/1982 | Barclay et al. |
| 4,408,463 A | 10/1983 | Barclay |
| 4,507,927 A | 4/1985 | Barclay |
| 4,507,928 A | 4/1985 | Johnson |
| 4,549,155 A | 10/1985 | Halbach |
| 4,554,790 A | 11/1985 | Nakagome et al. |
| 4,557,228 A | 12/1985 | Samodovitz |
| 4,599,866 A | 7/1986 | Nakagome et al. |
| 4,625,519 A | 12/1986 | Hakuraku et al. |
| 4,642,994 A | 2/1987 | Barclay et al. |
| 4,735,062 A | 4/1988 | Woolley et al. |
| 4,741,175 A | 5/1988 | Schulze |
| 4,785,636 A | 11/1988 | Hakuraku et al. |
| 4,796,430 A | 1/1989 | Malaker et al. |
| 5,062,471 A | 11/1991 | Jaeger |
| 5,091,361 A | 2/1992 | Hed |
| 5,156,003 A | 10/1992 | Yoshiro et al. |
| 5,190,447 A | 3/1993 | Schneider |
| 5,249,424 A | 10/1993 | DeGregoria et al. |
| 5,336,421 A | 8/1994 | Kurita et al. |
| 5,351,791 A | 10/1994 | Rosenzweig |
| 5,465,781 A | 11/1995 | DeGregoria |
| 5,599,177 A | 2/1997 | Hetherington |
| 5,661,895 A | 9/1997 | Irgens |
| 5,718,570 A | 2/1998 | Beckett et al. |
| 5,934,078 A | 8/1999 | Lawton, Jr. et al. |
| 6,332,323 B1 | 12/2001 | Reid et al. |
| 6,423,255 B1 | 7/2002 | Hoechsmann et al. |
| 6,446,441 B1 | 9/2002 | Dean |
| 6,467,274 B2 | 10/2002 | Barclay et al. |
| 6,517,744 B1 | 2/2003 | Hara et al. |
| 6,526,759 B2 | 3/2003 | Zimm et al. |
| 6,588,215 B1 | 7/2003 | Ghoshal |
| 6,612,816 B1 | 9/2003 | Vanden Brande et al. |
| 6,668,560 B2 | 12/2003 | Zimm et al. |
| 6,826,915 B2 | 12/2004 | Wada et al. |
| 6,840,302 B1 | 1/2005 | Tanaka et al. |
| 6,915,647 B2 | 7/2005 | Tsuchikawa et al. |
| 6,935,121 B2 | 8/2005 | Fang et al. |
| 6,946,941 B2 | 9/2005 | Chell |
| 6,971,245 B2 | 12/2005 | Kuroyanagi |
| 7,148,777 B2 | 12/2006 | Chell et al. |
| 7,297,270 B2 | 11/2007 | Bernard et al. |
| 7,313,926 B2 | 1/2008 | Gurin |
| 7,481,064 B2 | 1/2009 | Kitanovski et al. |
| 7,552,592 B2 | 6/2009 | Iwasaki et al. |
| 7,644,588 B2 | 1/2010 | Shin et al. |
| 7,863,789 B2 | 1/2011 | Zepp et al. |
| 7,897,898 B2 | 3/2011 | Muller et al. |
| 7,938,632 B2 | 5/2011 | Smith |
| 8,061,147 B2 | 11/2011 | Dinesen et al. |
| 8,069,662 B1 | 12/2011 | Albert |
| 8,099,964 B2 | 1/2012 | Saito et al. |
| 8,174,245 B2 | 5/2012 | Carver |
| 8,191,375 B2 | 6/2012 | Sari et al. |
| 8,209,988 B2 | 7/2012 | Zhang et al. |
| 8,216,396 B2 | 7/2012 | Dooley et al. |
| 8,310,325 B2 | 11/2012 | Zhang et al. |
| 8,375,727 B2 | 2/2013 | Sohn |
| 8,378,769 B2 | 2/2013 | Heitzler et al. |
| 8,448,453 B2 | 5/2013 | Bahl et al. |
| 8,551,210 B2 | 10/2013 | Reppel et al. |
| 8,596,084 B2 | 12/2013 | Herrera et al. |
| 8,616,009 B2 | 12/2013 | Dinesen et al. |
| 8,656,725 B2 | 2/2014 | Muller et al. |
| 8,695,354 B2 | 4/2014 | Heitzler et al. |
| 8,729,718 B2 | 5/2014 | Kuo et al. |
| 8,763,407 B2 | 7/2014 | Carroll et al. |
| 8,769,966 B2 | 7/2014 | Heitzler et al. |
| 8,869,541 B2 | 10/2014 | Heitzler et al. |
| 8,904,806 B2 | 12/2014 | Cramet et al. |
| 8,935,927 B2 | 1/2015 | Kobayashi et al. |
| 8,978,391 B2 | 3/2015 | Muller et al. |
| 9,175,885 B2 | 11/2015 | Katter |
| 9,245,673 B2 | 1/2016 | Carroll et al. |
| 9,377,221 B2 | 6/2016 | Benedict |
| 9,400,126 B2 | 7/2016 | Takahashi et al. |
| 9,523,519 B2 | 12/2016 | Muller |
| 9,534,817 B2 | 1/2017 | Benedict et al. |
| 9,548,151 B2 | 1/2017 | Muller |
| 9,599,374 B2 | 3/2017 | Takahashi et al. |
| 9,631,843 B2 | 4/2017 | Benedict |
| 9,702,594 B2 | 7/2017 | Vetrovec |
| 9,739,510 B2 | 8/2017 | Hassen |
| 9,746,214 B2 | 8/2017 | Zimm et al. |
| 9,797,630 B2 | 10/2017 | Benedict et al. |
| 9,810,454 B2 | 11/2017 | Tasaki et al. |
| 9,857,105 B1 | 1/2018 | Schroeder et al. |
| 9,857,106 B1 | 1/2018 | Schroeder et al. |
| 9,927,155 B2 | 3/2018 | Boeder et al. |
| 9,978,487 B2 | 5/2018 | Katter et al. |
| 10,006,675 B2 | 6/2018 | Benedict et al. |
| 10,018,385 B2 | 7/2018 | Radermacher et al. |
| 10,684,044 B2 | 6/2020 | Schroeder |
| 2002/0040583 A1 | 4/2002 | Barclay et al. |
| 2002/0066368 A1 | 6/2002 | Zornes |
| 2002/0087120 A1 | 7/2002 | Rogers et al. |
| 2003/0010054 A1 | 1/2003 | Esch et al. |
| 2003/0051774 A1 | 3/2003 | Saito |
| 2004/0093877 A1 | 5/2004 | Wada |
| 2004/0182086 A1 | 9/2004 | Chiang et al. |
| 2004/0187510 A1 | 9/2004 | Jung |
| 2004/0187803 A1 | 9/2004 | Regev |
| 2004/0250550 A1 | 12/2004 | Bruck |
| 2005/0017394 A1 | 1/2005 | Hochsmann et al. |
| 2005/0046533 A1 | 3/2005 | Chell |
| 2005/0109490 A1 | 5/2005 | Harmon et al. |
| 2005/0217278 A1 | 10/2005 | Mongia et al. |
| 2005/0263357 A1 | 12/2005 | Kuwahara |
| 2005/0274676 A1 | 12/2005 | Kumar et al. |
| 2006/0130518 A1 | 6/2006 | Kang et al. |
| 2006/0231163 A1 | 10/2006 | Hirosawa et al. |
| 2006/0279391 A1 | 12/2006 | Xia |
| 2007/0130960 A1 | 6/2007 | Muller et al. |
| 2007/0220901 A1 | 9/2007 | Kobayashi |
| 2008/0223853 A1 | 9/2008 | Muller et al. |
| 2008/0236171 A1 | 10/2008 | Saito et al. |
| 2008/0236175 A1 | 10/2008 | Chaparro Monferrer et al. |
| 2008/0303375 A1 | 12/2008 | Carver |
| 2009/0032223 A1 | 2/2009 | Zimmerman et al. |
| 2009/0091411 A1 | 4/2009 | Zhang et al. |
| 2009/0158749 A1 | 6/2009 | Sandeman |
| 2009/0217674 A1 | 9/2009 | Kaji et al. |
| 2009/0236930 A1 | 9/2009 | Nashiki |
| 2009/0266083 A1 | 10/2009 | Shin et al. |
| 2009/0308080 A1 | 12/2009 | Han et al. |
| 2009/0314860 A1 | 12/2009 | Wang et al. |
| 2009/0320499 A1 | 12/2009 | Muller et al. |
| 2010/0000228 A1 | 1/2010 | Wiest et al. |
| 2010/0058775 A1 | 3/2010 | Kaji et al. |
| 2010/0071383 A1 | 3/2010 | Zhang et al. |
| 2010/0116471 A1 | 5/2010 | Reppel et al. |
| 2010/0122488 A1 | 5/2010 | Fukai |
| 2010/0150747 A1 | 6/2010 | Mehta et al. |
| 2010/0162747 A1 | 7/2010 | Hamel et al. |
| 2010/0209084 A1 | 8/2010 | Nelson et al. |
| 2010/0236258 A1 | 9/2010 | Heitzler et al. |
| 2010/0276627 A1 | 11/2010 | Mazet |
| 2010/0303917 A1 | 12/2010 | Watson et al. |
| 2011/0000206 A1 | 1/2011 | Aprad |
| 2011/0042608 A1 | 2/2011 | Reesink |
| 2011/0048031 A1 | 3/2011 | Barve |
| 2011/0048690 A1 | 3/2011 | Reppel et al. |
| 2011/0058795 A1 | 3/2011 | Kleman et al. |
| 2011/0061398 A1 | 3/2011 | Shih et al. |
| 2011/0062821 A1 | 3/2011 | Chang et al. |
| 2011/0082026 A1 | 4/2011 | Sakatani et al. |
| 2011/0094243 A1 | 4/2011 | Carroll et al. |
| 2011/0129363 A1 | 6/2011 | Sakai et al. |
| 2011/0154832 A1 | 6/2011 | Barve et al. |

(56) References Cited

U.S. PATENT DOCUMENTS

| | | |
|---|---|---|
| 2011/0162388 A1 | 7/2011 | Barve et al. |
| 2011/0168363 A9 | 7/2011 | Reppel et al. |
| 2011/0173993 A1 | 7/2011 | Muller et al. |
| 2011/0182086 A1 | 7/2011 | Mienko et al. |
| 2011/0192836 A1 | 8/2011 | Muller et al. |
| 2011/0218921 A1 | 9/2011 | Addala et al. |
| 2011/0239662 A1 | 10/2011 | Bahl et al. |
| 2011/0284196 A1 | 11/2011 | Zanadi |
| 2011/0302931 A1 | 12/2011 | Sohn |
| 2011/0308258 A1 | 12/2011 | Smith et al. |
| 2011/0314836 A1 | 12/2011 | Heitzler et al. |
| 2012/0031108 A1 | 2/2012 | Kobayashi et al. |
| 2012/0033002 A1 | 2/2012 | Seeler et al. |
| 2012/0036868 A1 | 2/2012 | Heitzler et al. |
| 2012/0045698 A1 | 2/2012 | Shima |
| 2012/0060526 A1 | 3/2012 | May et al. |
| 2012/0079834 A1 | 4/2012 | Dinesen |
| 2012/0222427 A1 | 9/2012 | Hassen |
| 2012/0222428 A1 | 9/2012 | Celik et al. |
| 2012/0266591 A1 | 10/2012 | Morimoto et al. |
| 2012/0266607 A1 | 10/2012 | Morimoto et al. |
| 2012/0267090 A1 | 10/2012 | Kruglick |
| 2012/0272665 A1 | 11/2012 | Watanabe et al. |
| 2012/0272666 A1 | 11/2012 | Watanabe |
| 2012/0285179 A1 | 11/2012 | Morimoto |
| 2012/0291453 A1 | 11/2012 | Watanabe et al. |
| 2013/0019610 A1 | 1/2013 | Zimm et al. |
| 2013/0020529 A1 | 1/2013 | Chang et al. |
| 2013/0104568 A1 | 5/2013 | Kuo et al. |
| 2013/0106116 A1 | 5/2013 | Kuo et al. |
| 2013/0145573 A1 | 6/2013 | Bizhanzadeh |
| 2013/0180263 A1 | 7/2013 | Choi et al. |
| 2013/0186107 A1 | 7/2013 | Shih et al. |
| 2013/0187077 A1 | 7/2013 | Katter |
| 2013/0192269 A1 | 8/2013 | Wang |
| 2013/0199460 A1 | 8/2013 | Duplessis et al. |
| 2013/0200293 A1 | 8/2013 | Zhao et al. |
| 2013/0227965 A1 | 9/2013 | Yagi et al. |
| 2013/0232993 A1 | 9/2013 | Saito et al. |
| 2013/0255279 A1 | 10/2013 | Tomimatsu et al. |
| 2013/0269367 A1 | 10/2013 | Meillan |
| 2013/0298571 A1 | 11/2013 | Morimoto et al. |
| 2013/0300243 A1 | 11/2013 | Gieras et al. |
| 2013/0319012 A1 | 12/2013 | Kuo et al. |
| 2013/0327062 A1 | 12/2013 | Watanabe et al. |
| 2014/0020881 A1 | 1/2014 | Reppel et al. |
| 2014/0075958 A1 | 3/2014 | Takahashi et al. |
| 2014/0116538 A1 | 5/2014 | Tanaka et al. |
| 2014/0157793 A1 | 6/2014 | Johnson et al. |
| 2014/0165594 A1 | 6/2014 | Benedict |
| 2014/0165595 A1 | 6/2014 | Zimm et al. |
| 2014/0190182 A1 | 7/2014 | Benedict |
| 2014/0216057 A1 | 8/2014 | Oezcan |
| 2014/0260373 A1 | 9/2014 | Gerber et al. |
| 2014/0290273 A1 | 10/2014 | Benedict et al. |
| 2014/0290275 A1 | 10/2014 | Muller |
| 2014/0291570 A1 | 10/2014 | Klausner et al. |
| 2014/0305137 A1 | 10/2014 | Benedict |
| 2014/0305139 A1 | 10/2014 | Takahashi et al. |
| 2014/0311165 A1 | 10/2014 | Watanabe et al. |
| 2014/0325996 A1 | 11/2014 | Muller |
| 2014/0366557 A1 | 12/2014 | Mun et al. |
| 2015/0002713 A1 | 1/2015 | Benedict |
| 2015/0007582 A1 | 1/2015 | Kim et al. |
| 2015/0030483 A1 | 1/2015 | Ryu |
| 2015/0033762 A1 | 2/2015 | Cheng et al. |
| 2015/0033763 A1 | 2/2015 | Saito et al. |
| 2015/0047371 A1 | 2/2015 | Hu et al. |
| 2015/0068219 A1 | 3/2015 | Komorowski et al. |
| 2015/0089960 A1 | 4/2015 | Takahashi et al. |
| 2015/0096307 A1 | 4/2015 | Watanabe et al. |
| 2015/0114007 A1 | 4/2015 | Neilson et al. |
| 2015/0168030 A1 | 6/2015 | Leonard et al. |
| 2015/0184903 A1 | 7/2015 | Mun et al. |
| 2015/0211440 A1 | 7/2015 | Joffroy |
| 2015/0260433 A1 | 9/2015 | Choi et al. |
| 2015/0267943 A1 | 9/2015 | Kim et al. |
| 2015/0362224 A1 | 12/2015 | Benedict et al. |
| 2015/0362225 A1 | 12/2015 | Schwartz |
| 2015/0369524 A1 | 12/2015 | Ikegami et al. |
| 2016/0000999 A1 | 1/2016 | Focht et al. |
| 2016/0025385 A1 | 1/2016 | Auringer et al. |
| 2016/0032920 A1 | 2/2016 | Hatami Aghdam |
| 2016/0084544 A1 | 3/2016 | Radermacher et al. |
| 2016/0091227 A1 | 3/2016 | Leonard et al. |
| 2016/0146515 A1 | 5/2016 | Momen et al. |
| 2016/0216012 A1 | 7/2016 | Benedict et al. |
| 2016/0238287 A1 | 8/2016 | Benedict |
| 2016/0273811 A1 | 9/2016 | Smith et al. |
| 2016/0282021 A1 | 9/2016 | Zhao et al. |
| 2016/0298880 A1 | 10/2016 | Humburg |
| 2016/0355898 A1 | 12/2016 | Vieyra Villegas et al. |
| 2016/0356529 A1 | 12/2016 | Humburg |
| 2016/0367982 A1 | 12/2016 | Pennie |
| 2017/0059213 A1 | 3/2017 | Barclay et al. |
| 2017/0059215 A1 | 3/2017 | Watanabe et al. |
| 2017/0071234 A1 | 3/2017 | Garg |
| 2017/0138648 A1 | 5/2017 | Cui et al. |
| 2017/0159982 A1* | 6/2017 | West .................. F25B 49/00 |
| 2017/0176083 A1 | 6/2017 | Sul et al. |
| 2017/0309380 A1 | 10/2017 | Benedict et al. |
| 2017/0328603 A1 | 11/2017 | Barclay et al. |
| 2017/0328649 A1 | 11/2017 | Brandmeier |
| 2017/0370624 A1 | 12/2017 | Zimm et al. |
| 2018/0005735 A1 | 1/2018 | Scharf et al. |
| 2018/0023852 A1 | 1/2018 | Schroeder et al. |
| 2018/0045437 A1 | 2/2018 | Vetrovec |
| 2018/0195775 A1 | 7/2018 | Schroeder et al. |
| 2018/0283740 A1 | 10/2018 | Holladay et al. |
| 2018/0340715 A1 | 11/2018 | Benedict et al. |
| 2019/0206578 A1 | 7/2019 | Wong |

FOREIGN PATENT DOCUMENTS

| | | |
|---|---|---|
| CN | 1977131 A | 6/2007 |
| CN | 101280983 A | 10/2008 |
| CN | 101495818 A | 7/2009 |
| CN | 101842647 A | 9/2010 |
| CN | 101979937 A | 2/2011 |
| CN | 201772566 U | 3/2011 |
| CN | 102165615 A | 8/2011 |
| CN | 101788207 B | 9/2011 |
| CN | 102345942 A | 2/2012 |
| CN | 202432596 U | 9/2012 |
| CN | 103090583 A | 5/2013 |
| CN | 103712401 A | 4/2014 |
| CN | 102077303 B | 4/2015 |
| CN | 106481842 A | 3/2017 |
| CN | 106949673 A | 7/2017 |
| CN | 107003041 A | 8/2017 |
| CN | 108895704 A * | 11/2018 |
| DE | 804694 C | 4/1951 |
| DE | 1514388 A1 | 6/1969 |
| DE | 102013223959 A1 | 5/2015 |
| DE | 202015106851 U1 | 3/2016 |
| EP | 0187078 A1 | 7/1986 |
| EP | 2071255 A1 | 6/2009 |
| EP | 2108904 A1 | 10/2009 |
| EP | 2215955 A1 | 8/2010 |
| EP | 2322072 A2 | 5/2011 |
| EP | 2420760 A1 | 2/2012 |
| EP | 2813785 A1 | 12/2014 |
| EP | 3306082 A2 | 4/2018 |
| FR | 2935468 A1 | 3/2010 |
| JP | 59232922 A | 12/1984 |
| JP | H08166182 A | 6/1996 |
| JP | 3205196 B2 | 9/2001 |
| JP | 2002315243 A | 10/2002 |
| JP | 2007147136 A | 6/2007 |
| JP | 2007291437 A | 11/2007 |
| JP | 2008051412 A | 3/2008 |
| JP | 2010112606 A | 5/2010 |
| JP | 2010525291 A | 7/2010 |
| JP | 6212955 B2 | 12/2014 |

(56) References Cited

FOREIGN PATENT DOCUMENTS

| | | |
|---|---|---|
| JP | 2014228216 A | 12/2014 |
| JP | 5907023 B2 | 4/2016 |
| JP | 6079498 B2 | 2/2017 |
| JP | 6191539 B2 | 9/2017 |
| JP | 2017207222 A | 11/2017 |
| KR | 101100301 B1 | 12/2011 |
| KR | 101238234 B1 | 3/2013 |
| WO | WO0133145 A1 | 5/2001 |
| WO | WO0212800 A1 | 2/2002 |
| WO | WO03016794 A1 | 2/2003 |
| WO | WO2004/068512 A1 | 8/2004 |
| WO | WO2007/036729 A1 | 4/2007 |
| WO | WO2007/086638 A1 | 8/2007 |
| WO | WO2009/024412 A1 | 2/2009 |
| WO | WO2009/098391 A1 | 8/2009 |
| WO | WO2010/119591 A1 | 10/2010 |
| WO | WO2011034594 A1 | 3/2011 |
| WO | WO2011152179 A1 | 12/2011 |
| WO | WO2014099199 A1 | 6/2014 |
| WO | WO2014170447 A1 | 10/2014 |
| WO | WO2014173787 A1 | 10/2014 |
| WO | WO2015017230 A1 | 2/2015 |
| WO | WO2016005774 A1 | 1/2016 |
| WO | WO2016035267 A1 | 3/2016 |
| WO | WO2017042266 A1 | 3/2017 |
| WO | WO2017081048 A2 | 5/2017 |
| WO | WO2017097989 A1 | 6/2017 |

OTHER PUBLICATIONS

International Search Report issued in connection with PCT Application No. PCT/US2014/042485 dated Oct. 23, 2014.
International Search Report issued in connection with PCT Application No. PCT/US2014/017431 dated May 9, 2014.
International Search Report issued in connection with PCT/US2013/070518, dated Jan. 22, 2014.
Tetsuji Okamura, Performance of a room-temperature rotary magnet refrigerator, dated Nov. 28, 2005, Elsevier.
Journal of Alloys and Compounds, copyright 2008 Elsevier B.V. Evaluation of Ni—Mn—In—Si Alloys for Magnetic Refrigerant Application, Rahul Das, A. Perumal and A. Srinivasan, Dept of Physics, Indian Institute of Technology, Oct. 10, 2011.
Effects of annealing on the magnetic entropy change and exchange bias behavior in melt-spun Ni—Mn—In ribbons, X.Z. Zhao, C.C. Hsieh, et al Science Direct, Scripta Materialia 63 (2010).
PCT International Search Report and Written Opinion issued in connection with PCT Application No. PCT/US2013/070023 dated Feb. 27, 2014.
Barbara Pulko, Epoxy-bonded La—Fe—Co—Si magnetocaloric plates, Journal of Magnetism and Magnetic Materials, 375 (2015) 65-73.
International Search Report of PCT/US2014/047 925 dated Nov. 10, 2014.
Andrej Kitanovski, Present and future caloric refrigeration and heat-pump technologies, International Journal of Refrigeration vol. 57, Sep. 2015, pp. 288-298.
C Aprea, et al., An innovative rotary permanent magnet magnetic refrigerator based on AMR cycle, Thermal Energy Systems: Production, Storage, Utilization and the Environment, dated May 2015, Napoli, Italy, pp. 1-5.
International Search Report, PCT Application No. PCT/CN2019/096188, dated Oct. 15, 2019, 5 pages.
International Search Report, PCT Application No. PCT/CN2019/096187, dated Sep. 30, 2019, 4 pages.

* cited by examiner

FAN SPEED CONTROL METHOD FOR CALORIC HEAT PUMP SYSTEMS

FIELD OF THE INVENTION

The present subject matter relates generally to control methods for caloric heat pump systems.

BACKGROUND OF THE INVENTION

Conventional refrigeration technology typically utilizes a heat pump that relies on compression and expansion of a fluid refrigerant to receive and reject heat in a cyclic manner so as to effect a desired temperature change or transfer heat energy from one location to another. This cycle can be used to receive heat from a refrigeration compartment and reject such heat to the environment or a location that is external to the compartment. Other applications include air conditioning of residential or commercial structures. A variety of different fluid refrigerants have been developed that can be used with the heat pump in such systems.

While improvements have been made to such heat pump systems that rely on the compression of fluid refrigerant, at best such can still only operate at about forty-five percent or less of the maximum theoretical Carnot cycle efficiency. Also, some fluid refrigerants have been discontinued due to environmental concerns. The range of ambient temperatures over which certain refrigerant-based systems can operate may be impractical for certain locations. Other challenges with heat pumps that use a fluid refrigerant exist as well.

Magneto-caloric materials (MCMs), i.e. materials that exhibit the magneto-caloric effect, provide a potential alternative to fluid refrigerants for heat pump applications. In general, the magnetic moments of MCMs become more ordered under an increasing, externally applied magnetic field and cause the MCMs to generate heat. Conversely, decreasing the externally applied magnetic field allows the magnetic moments of the MCMs to become more disordered and allow the MCMs to absorb heat. Some MCMs exhibit the opposite behavior, i.e. generating heat when the magnetic field is removed (which are sometimes referred to as para-magneto-caloric material but both types are referred to collectively herein as magneto-caloric material or MCM). The theoretical Carnot cycle efficiency of a refrigeration cycle based on an MCMs can be significantly higher than for a comparable refrigeration cycle based on a fluid refrigerant. As such, a heat pump system that can effectively use an MCM would be useful.

Challenges exist to the practical and cost competitive use of an MCM, however. In addition to the development of suitable MCMs, equipment that can attractively utilize an MCM is still needed. Currently proposed equipment may require relatively large and expensive magnets, may be impractical for use in e.g., appliance refrigeration, and may not otherwise operate with enough efficiency to justify capital cost.

Accordingly, a heat pump system that can address certain challenges, such as those identified above, would be useful. Such a heat pump system that can also be used in a refrigerator appliance would also be useful.

BRIEF DESCRIPTION OF THE INVENTION

Aspects and advantages of the invention will be set forth in part in the following description, or may be apparent from the description, or may be learned through practice of the invention.

In a first example embodiment, a method for operating a caloric heat pump system includes changing a cycle frequency at which a field of a field generator is applied to caloric material in the caloric heat pump system. The method also includes adjusting a speed of a hot side fan in response to the cycle frequency change and adjusting a speed of a cold side fan in response to the cycle frequency change. The hot side fan is operable to flow air over a hot side heat exchanger of the caloric heat pump system, and the cold side fan is operable to flow air over a cold side heat exchanger of the caloric heat pump system. A respective one of three separate control loops changes the cycle frequency, adjusts the speed of the hot side fan, and adjusts the speed of the cold side fan.

In a second example embodiment, a method for operating a caloric heat pump system includes changing a cycle frequency at which a field of a field generator is applied to caloric material in the caloric heat pump system. The method also includes adjusting a speed of a hot side fan in response to the cycle frequency change such that a lift within the hot side heat exchanger is essentially constant before and after changing the cycle frequency. The method further includes adjusting a speed of a cold side fan in response to the cycle frequency change such that a lift within the cold side heat exchanger is essentially constant before and after changing the cycle frequency. The hot side fan is operable to flow air over a hot side heat exchanger of the caloric heat pump system, and the cold side fan is operable to flow air over a cold side heat exchanger of the caloric heat pump system. A respective one of three separate control loops changes the cycle frequency, adjusts the speed of the hot side fan, and adjusts the speed of the cold side fan.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present subject matter is directed to caloric heat pump systems for heating or cooling an appliance, such as a refrigerator appliance. While described in greater detail below in the context of a magneto-caloric heat pump system, one of skill in the art using the teachings herein will recognize that other suitable caloric materials may be used in a similar manner to heat or cool an appliance, i.e., apply a field, move heat, remove the field, move heat. For example, electro-caloric material heats up and cools down within increasing and decreasing electric fields. As another example, elasto-caloric material heats up and cools down when exposed to increasing and decreasing mechanical strain. As yet another example, baro-caloric material heats up and cools down when exposed to increasing and decreasing pressure. Such materials and other similar caloric materials may be used in place of or in addition to the magneto-caloric material described below to heat or cool fluid within an appliance. Thus, caloric material is used broadly herein to encompass materials that undergo heating or cooling when exposed to a changing field from a field generator, where the field generator may be a magnet, an electric field generator, an actuator for applying mechanical stress or pressure, etc.

Figure 1:
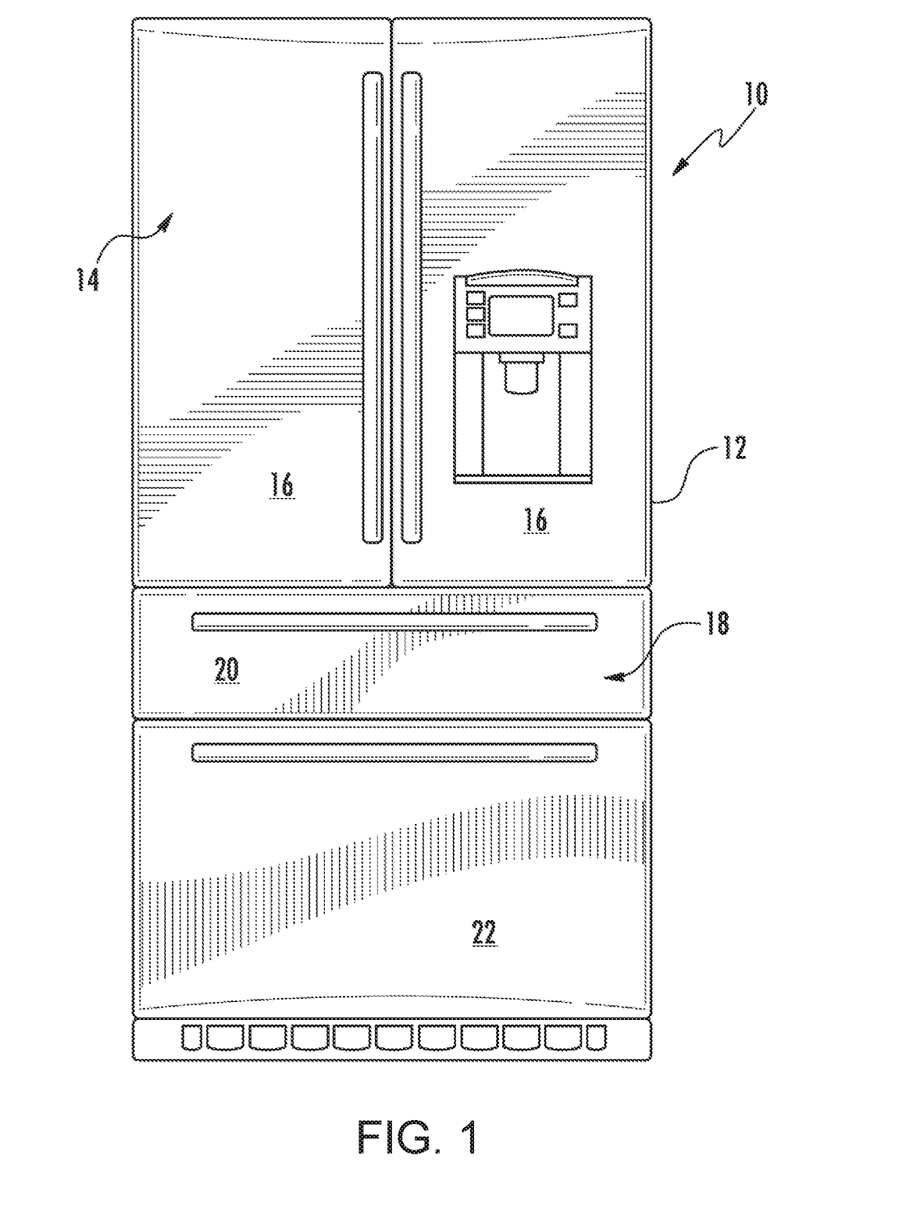
FIG. 1 is a refrigerator appliance in accordance with an example embodiment of the present disclosure.

Referring now to FIG. 1, an example embodiment of a refrigerator appliance 10 is depicted as an upright refrigerator having a cabinet or casing 12 that defines a number of internal storage compartments or chilled chambers. In particular, refrigerator appliance 10 includes upper fresh-food compartments 14 having doors 16 and lower freezer compartment 18 having upper drawer 20 and lower drawer 22. Drawers 20, 22 are "pull-out" type drawers in that they can be manually moved into and out of freezer compartment 18 on suitable slide mechanisms. Refrigerator 10 is provided by way of example only. Other configurations for a refrigerator appliance may be used as well including appliances with only freezer compartments, only chilled compartments, or other combinations thereof different from that shown in FIG. 1. In addition, the heat pump and heat pump system of the present disclosure is not limited to refrigerator appliances and may be used in other applications as well such as e.g., air-conditioning, electronics cooling devices, and others. Thus, it should be understood that while the use of a heat pump and heat pump system to provide cooling within a refrigerator is provided by way of example herein, the present disclosure may also be used to provide for heating applications as well.

Figure 2:
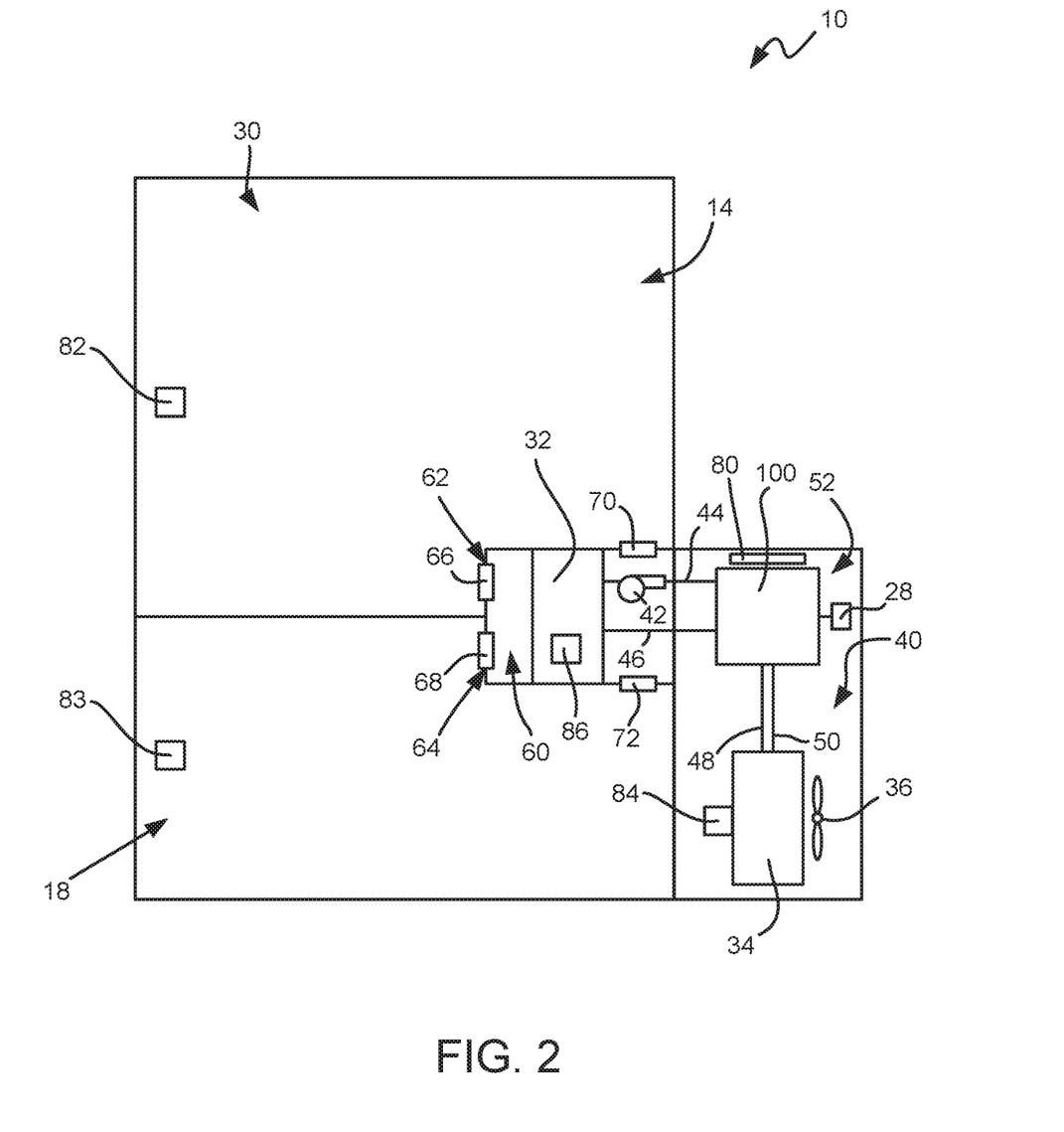
FIG. 2 is a schematic illustration of certain components of a heat pump system positioned in the example refrigerator appliance of FIG. 1.

FIG. 2 is a schematic view of various components of refrigerator appliance 10, including refrigeration compartments 30 (e.g., fresh-food compartments 14 and freezer compartment 18) and a machinery compartment 40. Refrigeration compartment 30 and machinery compartment 40 include a heat pump system 52 having a first or cold side heat exchanger 32 positioned in refrigeration compartment 30 for the removal of heat therefrom. A heat transfer fluid such as e.g., an aqueous solution, flowing within cold side heat exchanger 32 receives heat from refrigeration compartment 30 thereby cooling contents of refrigeration compartment 30.

The heat transfer fluid flows out of cold side heat exchanger 32 by line 44 to heat pump 100. As will be further described herein, the heat transfer fluid receives additional heat from magneto-caloric material (MCM) in heat pump 100 and carries this heat by line 48 to second or hot side heat exchanger 34. Heat is released to the environment, machinery compartment 40, and/or other location external to refrigeration compartment 30 using second heat exchanger 34. A hot side fan 36 may be used to create a flow of air across second heat exchanger 34 and thereby improve the rate of heat transfer to the environment. A pump or pumps 42 cause the heat transfer fluid to recirculate in heat pump system 52. Motor 28 is in mechanical communication with heat pump 100 and is operable to provide relative motion between a field generator and a regenerator housing of heat pump 100, as discussed in greater detail below.

From second heat exchanger 34, the heat transfer fluid returns by line 50 to heat pump 100 where, as will be further described below, the heat transfer fluid loses heat to the MCM in heat pump 100. The now colder heat transfer fluid flows by line 46 to cold side heat exchanger 32 to receive heat from refrigeration compartment 30 and repeat the cycle as just described.

Heat pump system 52 is provided by way of example only. Other configurations of heat pump system 52 may be used as well. For example, lines 44, 46, 48, and 50 provide fluid communication between the various components of heat pump system 52 but other heat transfer fluid recirculation loops with different lines and connections may also be employed. Still other configurations of heat pump system 52 may be used as well.

Refrigerator appliance 10 also includes features for regulating air flow across cold side heat exchanger 32 and to fresh-food compartments 14 and freezer compartment 18. As may be seen in FIG. 2, cold side heat exchanger 32 may be positioned within a heat exchanger compartment 60 that is defined within cabinet 12, e.g., between fresh-food compartments 14 and freezer compartment 18. Fresh-food compartment 14 is contiguous with heat exchanger compartment 60 through a fresh food duct 62. Thus, air may flow between fresh-food compartment 14 and heat exchanger compartment 60 via fresh food duct 62. Freezer compartment 18 is contiguous with heat exchanger compartment 60 through a freezer duct 64. Thus, air may flow between freezer compartment 18 and heat exchanger compartment 60 via freezer duct 64.

Refrigerator appliance 10 also includes a fresh food fan 66 and a freezer fan 68. Fresh food fan 66 and/or freezer fan 68 may be referred to herein as a cold side fan. Fresh food fan 66 may be used to create a flow of air across cold side heat exchanger 32 and thereby improve the rate of heat transfer to air within fresh food duct 62. For example, fresh food fan 66 may be positioned at or within fresh food duct 62, and fresh food fan 66 may be operable to force air flow between fresh-food compartment 14 and heat exchanger compartment 60 through fresh food duct 62. Freezer fan 68 may be used to create a flow of air across cold side heat exchanger 32 and thereby improve the rate of heat transfer to air within freezer duct 64. For example, freezer fan 68 may be positioned at or within freezer duct 64, and freezer fan 68 may be operable to force air flow between freezer compartment 18 and heat exchanger compartment 60 through freezer duct 64.

Refrigerator appliance 10 may also include a fresh food damper 70 and a freezer damper 72. Fresh food damper 70 is positioned at or within fresh food duct 62 and is operable to restrict air flow through fresh food duct 62. For example, when fresh food damper 70 is closed, fresh food damper 70 blocks air flow through fresh food duct 62, e.g., and thus between fresh-food compartment 14 and heat exchanger compartment 60. Freezer damper 72 is positioned at or within freezer duct 64 and is operable to restrict air flow through freezer duct 64. For example, when freezer damper 72 is closed, freezer damper 72 blocks air flow through freezer duct 64, e.g., and thus between freezer compartment 18 and heat exchanger compartment 60. It will be understood that the positions of fans 66, 68 and dampers 70, 72 may be switched in alternative example embodiments.

Operation of heat pump system 52 and fresh food fan 66 while fresh food damper 70 is open, allows chilled air from cold side heat exchanger 32 to cool fresh-food compartment 14, e.g., to about forty degrees Fahrenheit (40° F.). Similarly, operation of heat pump system 52 and freezer fan 68 while freezer damper 72 is open, allows chilled air from cold side heat exchanger 32 to cool freezer compartment 18, e.g., to about negative ten degrees Fahrenheit (−10° F.). Thus, cold side heat exchanger 32 may chill either fresh-food compartment 14 or freezer compartment 18 during operation of heat pump system 52. In such a manner, both fresh-food compartments 14 and freezer compartment 18 may be air cooled with cold side heat exchanger 32.

Refrigerator appliance 10 may include a controller 80 that regulates various components of refrigerator appliance 10. Thus, controller 80 may be in operative communication with various components of refrigerator appliance 10, such as motor 28, pump 42, fans 36, 66, 68 and dampers 70, 72. Controller 80 may include memory and one or more processing devices such as microprocessors, CPUs or the like, such as general or special purpose microprocessors operable to execute programming instructions or micro-control code associated with operation of range appliance 100. The memory can be non-transitory and represent random access memory such as DRAM, or read only memory such as ROM or FLASH. The processor executes programming instructions stored in the memory. The memory can be a separate component from the processor or can be included onboard within the processor. Alternatively, controller 80 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Controller 80 may communicate with various components of refrigerator appliance 10 via a suitable wiring harness or communications bus.

Figure 3:
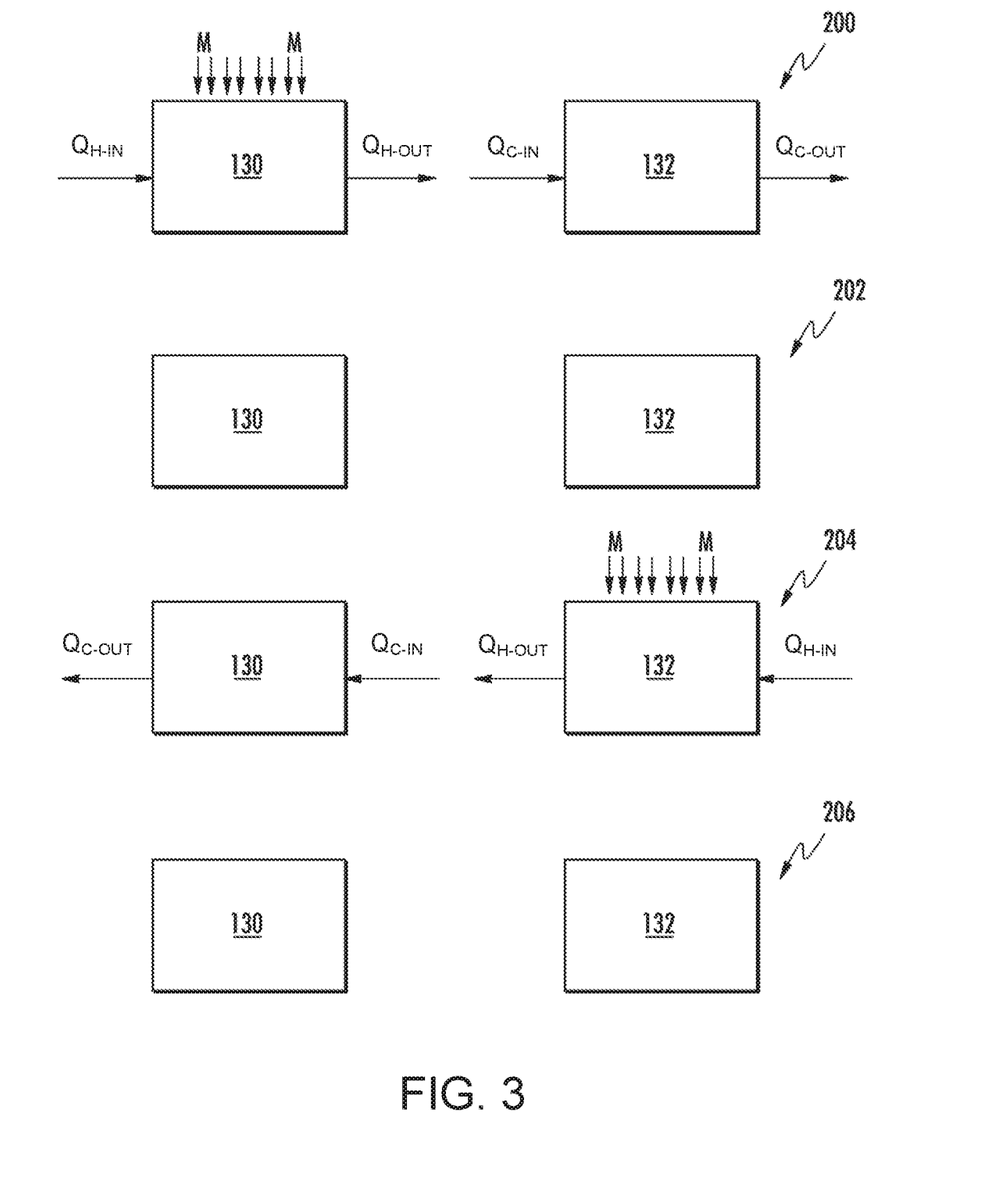
FIG. 3 is a schematic diagram illustrating various positions and movements there-between of MCM stages in accordance with an example embodiment of the present disclosure.

Heat pump 100 may include a plurality of stages, each of which includes a magneto-caloric material (MCM). In example embodiments, such MCM stages may be provided in pairs, each of which may for example include a first stage 130 and a second stage 132 as shown in FIG. 3. Each stage 130, 132 may include one or more different types of MCM. Further, the MCM(s) provided in each stage 130, 132 may be the same or may be different.

Heat pumps 100 also includes one or more magnet assemblies (not shown), each of which creates a magnetic field M, or other suitable field generators. The stages 130, 132 and magnet assembly(s) may be movable relative to each other. Such relative movement between stages 130, 132 and an associated magnet assembly causes movement of each stage 130, 132 into the magnetic field M and out of the magnetic field M. As discussed herein, movement of a stage 130, 132 into the magnetic field M may cause the magnetic moments of the material to orient and the MCM to heat (or alternatively cool) as part of the magneto-caloric effect. When one of stages 130, 132 is out of the magnetic field M, the MCM may thus cool (or alternatively heat) due to disorder of the magnetic moments of the material. Motor 26 may be in mechanical communication with stages 130, 132 and configured for linearly or rotatably moving stages 130, 132 relative to the magnet assemblies.

Referring also to FIG. 2, in some example embodiments, lines 44, 46, 48, 50 may facilitate the flow of working fluid between heat exchangers 32, 34 and heat pump 100. In example embodiments, lines 44, 46, 48, 50 may facilitate the flow of working fluid between heat exchangers 32, 34 and stages 130, 132 of heat pump 100. For example, a line 44, e.g., a cold side working fluid return conduit, may extend between cold side heat exchanger 32 and a regenerator housing (not shown) containing stages 130, 132, such that working fluid from an outlet of cold side heat exchanger 32 flows through line 44 to stages 130, 132. A line 46, e.g., a cold side working fluid supply conduit, may extend between the regenerator housing containing stages 130, 132 and cold side heat exchanger 32, such that working fluid from the regenerator housing containing stages 130, 132 flows through line 46 to an inlet of cold side heat exchanger 32. A line 50, e.g., a hot side working fluid return conduit, may extend between hot side heat exchanger 34 and the regenerator housing containing stages 130, 132, such that working fluid from an outlet of heat exchanger 34 flows through line 50 to stages 130, 132. A line 48, e.g., a hot side working fluid supply conduit, may extend between the regenerator housing containing stages 130, 132 and hot side heat exchanger 34, such that working fluid from the regenerator housing containing stages 130, 132 flows through line 48 to an inlet of heat exchanger 34. Heat pump system 52 may also include at least one pump 42 that is operable to flow the working fluid through lines 44, 46, 48, 50.

FIG. 3 illustrates an example method of the present disclosure using a schematic representation of associated stages 130, 132 of MCM during dwelling in and movement between the various positions as discussed herein. Motor 28 may move stages 130, 132 into and out of the magnetic field M in the manner described below during operation of heat pump 100.

With regard to first stage 130, during step 200, which corresponds to the first position, stage 130 is fully within magnetic field M, which causes the magnetic moments of the material to orient and the MCM to heat as part of the magneto caloric effect. Further, pump 42 actively flows working fluid. As indicated by arrow $Q_{H-OUT}$, working fluid in stage 130, now heated by the MCM, can travel out of stage 130 and along line 48 to second heat exchanger 34. At the same time, and as indicated by arrow $Q_{H-IN}$, working fluid from cold side heat exchanger 32 flows into stage 130 from line 44. Because working fluid from cold side heat exchanger 32 is relatively cooler than the MCM in stage 130, the MCM will lose heat to the working fluid.

In step 202, stage 130 is moved from the first position to the second position in the first transition. During the time in the first transition, working fluid dwells in the MCM of stage 130. More specifically, the working fluid does not actively flow through stage 130.

In step 204, stage 130 is in the second position and thus out of magnetic field M. The absence or lessening of the magnetic field is such that the magnetic moments of the material become disordered and the MCM absorbs heat as part of the magnetocaloric effect. Further, pump 42 actively flows working fluid. As indicated by arrow $Q_{C-OUT}$, working fluid in stage 130, now cooled by the MCM, can travel out of stage 130 and along line 46 to cold side heat exchanger 32. At the same time, and as indicated by arrow $Q_{C-IN}$, working fluid from second heat exchanger 34 flows into stage 112 from line 50 when stage 130 is in the second transition. Because working fluid from second heat exchanger 34 is relatively warmer than the MCM in stage 130, the MCM will lose some of its heat to the working fluid. The working fluid now travels along line 46 to cold side heat exchanger 32 to receive heat and cool refrigeration compartment 30.

In step 206, stage 130 is moved from the second position to the first position in the second transition. During the time in the second transition, the working fluid dwells in the MCM of stage 130. More specifically, the working fluid does not actively flow through stage 130.

With regard to second stage 132, during step 200, which corresponds to the first position, second stage 132 is out of magnetic field M. The absence or lessening of the magnetic field is such that the magnetic moments of the material become disordered and the MCM absorbs heat as part of the magneto-caloric effect. Further, pump 42 actively flows working fluid. As indicated by arrow $Q_{C-OUT}$, working fluid in stage 132, now cooled by the MCM, can travel out of stage 132 and along line 46 to cold side heat exchanger 32. At the same time, and as indicated by arrow $Q_{C-IN}$, working fluid from second heat exchanger 34 flows into stage 112 from line 50 when stage 132 is in the second transition. Because working fluid from second heat exchanger 34 is relatively warmer than the MCM in stage 132, the MCM will lose some of its heat to the working fluid. The working fluid now travels along line 46 to cold side heat exchanger 32 to receive heat and cool the refrigeration compartment 30.

In step 202, stage 132 is moved from the first position to the second position in the first transition. During the time in the first transition, the working fluid dwells in the MCM of stage 132. More specifically, the working fluid does not actively flow through stage 132.

In step 204, stage 132 is in the second position and thus fully within magnetic field M, which causes the magnetic moments of the material to orient and the MCM to heat as part of the magneto caloric effect. Further, pump 42 actively flows working fluid. As indicated by arrow $Q_{H-OUT}$, working fluid in stage 132, now heated by the MCM, can travel out of stage 132 and along line 48 to second heat exchanger 34. At the same time, and as indicated by arrow $Q_{H-IN}$, working fluid from cold side heat exchanger 32 flows into stage 132 from line 44. Because working fluid from cold side heat exchanger 32 is relatively cooler than the MCM in stage 132, the MCM will lose heat to the working fluid.

In step 206, stage 132 is moved from the second position to the first position in the second transition. During the time in the second transition, working fluid dwells in the MCM of stage 132. More specifically, the working fluid does not actively flow through stage 132.

Figure 4:
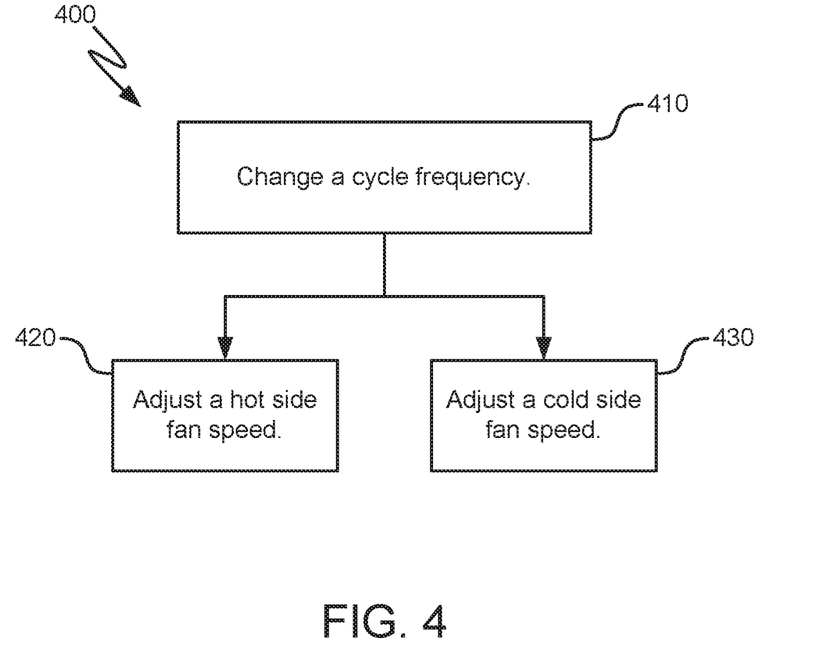
FIG. 4 illustrates a method for operating a caloric heat pump system according to an example embodiment of the present subject matter.

FIG. 4 illustrates a method 400 for operating a caloric heat pump system according to an example embodiment of the present subject matter. Method 400 may be used to operate any suitable caloric heat pump system, such as heat pump system 52. Thus, while described in greater detail below in the context of heat pump system 52, it will be understood that the method described below may be used in or with any other suitable caloric heat pump system in alterative example embodiments. As an example, controller 80 may be programmed to implement method 400. The method may assist with operating heat pump system 52 efficiently.

At 410, method 400 includes changing a cycle frequency of heat pump 100. For example, a speed of motor 28 may be increased or decreased to change cycle frequency at which the magnetic field M is applied to stages 130, 132 and MCM within stages 130, 132. The cycle frequency may be varied based on a measured temperature of fresh-food compartment 14 and/or freezer compartment 18 that is indicative of the cooling load for cold side heat exchanger 32. As an example, the speed of motor 28 may be increased when the measured temperature of the chilled chamber from a temperature sensor 82 is greater than a set temperature for the chilled chamber and thus the cooling load for cold side heat exchanger 32 has increased. As another example, the speed of motor 28 may be decreased when the measured temperature of the chilled chamber from temperature sensor 82 is less than the set temperature for the chilled chamber and thus the cooling load for cold side heat exchanger 32 has decreased. As may be seen from the above, the cycle frequency of heat pump 100 may be based upon the required cooling load for cold side heat exchanger 32, which may be based on a difference between the measured temperature of the chilled chamber and the set temperature for the chilled chamber. The set temperature may correspond to the desired temperature for the chilled chamber, e.g., less than freezing for freezer compartment 18 and slightly greater than freezing for fresh-food compartment 14.

Changing cycle frequency may directly influence cooling capacity and efficiency of heat pump 100. Thus, as a result of changing the cycle frequency of heat pump 100 at 410, the cooling capacity of heat pump 100 may also change. At 420 and 430, fan speeds at cold and hot side heat exchangers 32, 34 may be adjusted, e.g., according to efficiency and/or power versus speed curves to maintain cold and hot return liquid temperatures at the optimal efficiency points, to account for such change in the cooling capacity of heat pump 100. In particular, controller 80 may include three separate control loops that change the cycle frequency of heat pump 100, adjusts the speed of hot side fan 36, and adjusts the speed of cold side fans 66, 68. Thus, e.g., controller 80 may have three different control loops for controlling each of a cold side fluid temperature, a hot side fluid temperature, and a speed of motor 28.

Various mechanisms may be used at 420, 430 to adjust fan speeds at cold and hot side heat exchangers 32, 34. For example, a model may be used to determine maximal efficiency fan speed for each cycle frequency and air temperature combination, e.g., via a function (correlative or physics based) or with lookup tables and interpolation based on experimental values. In particular, an air temperature proximate hot side heat exchanger 34 may be measured, e.g., with controller 80 via a temperature sensor 84 in machinery compartment 40 or on hot side heat exchanger 34, and controller 80 may adjust the speed of hot side fan 36 to the speed calculated from a model of maximal efficiency fan speed as a function of cycle frequency and air temperature proximate hot side heat exchanger 34. Thus, the current cycle frequency and the measured air temperature proximate hot side heat exchanger 34 may be plugged into the model to calculate maximal efficiency fan speed for hot side fan 36, and controller 80 may adjust the speed of hot side fan 36 to the maximal efficiency fan speed in order to maintain the return temperature of the heat transfer fluid from hot side heat exchanger 34 at an optimal efficiency point. As another example, controller 80 may adjust the speed of hot side fan 36 to the speed selected from a lookup table of maximal efficiency fan speed versus cycle frequency and air temperature proximate hot side heat exchanger 34. Thus, the current cycle frequency and the measured air temperature proximate hot side heat exchanger 34 may be used to select, e.g., via interpolation, the corresponding maximal efficiency fan speed for hot side fan 36 in the lookup table, and controller 80 may adjust the speed of hot side fan 36 to the maximal efficiency fan speed in order to maintain the return temperature of the heat transfer fluid from hot side heat exchanger 34 at the optimal efficiency point.

The speed of one or more of cold side fans 66, 68 may be adjusted in the same or similar manner to that described above for hot side fan 36. For example, an air temperature proximate cold side heat exchanger 32 may be measured, e.g., with controller 80 via a temperature sensor 82 in fresh-food compartments 14 and/or a temperature sensor 83 in freezer compartment 18 or on cold side heat exchanger 32, and controller 80 may adjust the speed of one or more of cold side fans 66, 68 to the speed calculated from a model of maximal efficiency fan speed as a function of cycle frequency and air temperature proximate cold side heat exchanger 32. Thus, the current cycle frequency and the measured air temperature proximate cold side heat exchanger 32 may be plugged into the model to calculate maximal efficiency fan speed for one or more of cold side fans 66, 68, and controller 80 may adjust the speed of the one or more of cold side fans 66, 68 to the maximal efficiency fan speed in order to maintain the return temperature of the heat transfer fluid from cold side heat exchanger 32 at an optimal efficiency point. As another example, controller 80 may adjust the speed of one or more of cold side fans 66, 68 to the speed selected from a lookup table of maximal efficiency fan speed versus cycle frequency and air temperature proximate cold side heat exchanger 32. Thus, the current cycle frequency and the measured air temperature proximate cold side heat exchanger 32 may be used to select, e.g., via interpolation, the corresponding maximal efficiency fan speed for one or more of cold side fans 66, 68 in the lookup table, and controller 80 may adjust the speed of the one or more of cold side fans 66, 68 to the maximal efficiency fan speed in order to maintain the return temperature of the heat transfer fluid from cold side heat exchanger 32 at the optimal efficiency point.

In alternative example embodiments, a model may be used to determine maximal efficiency return temperatures for each frequency and heat transfer fluid temperature combination, e.g., via a function (correlative or physics based) or with lookup tables and interpolation based on experimental values. Thus, maximal efficiency return temperatures for heat transfer fluids from cold side heat exchanger 32 and hot side heat exchanger 34 may be described with functions or tables, and speeds of hot side fan 36 and/or cold side fans 66, 68 may be adjusted by controller 80 using a PID, PI, or similar control methodology towards the target maximal efficiency return temperatures. In particular, a heat transfer fluid temperature returning from hot side heat exchanger 34 may be measured, e.g., with controller 80 via a temperature sensor 84 on hot side heat exchanger 34, line 50, etc. A desired hot side fluid return temperature may also be calculated from a model of maximal efficiency hot side fluid return temperature as a function of cycle frequency, and the speed of hot side fan 36 may be adjusted to drive the measured heat transfer fluid temperature returning from hot side heat exchanger 34 from temperature sensor 84 towards the desired hot side fluid return temperature. Thus, the current cycle frequency may be plugged into the model to calculate the desired hot side fluid return temperature, and controller 80 may adjust the speed of hot side fan 36 to drive the measured heat transfer fluid temperature returning from hot side heat exchanger 34 from temperature sensor 84 towards the desired hot side fluid return temperature in order to maintain the return temperature of the heat transfer fluid from hot side heat exchanger 34 at an optimal efficiency point. Alternatively, a lookup table of maximal efficiency hot side fluid return temperature versus cycle frequency may be used to determine the desired hot side fluid return temperature rather than a model, such as a continuous linear model of the desired hot side fluid return temperature.

The speed of one or more of cold side fans 66, 68 may be adjusted in the same or similar manner to that described above for hot side fan 36. For example, a heat transfer fluid temperature returning from cold side heat exchanger 32 may be measured, e.g., with controller 80 via a temperature sensor 86 on cold side heat exchanger 32, line 44, etc. A desired cold side fluid return temperature may also be calculated from a model of maximal efficiency cold side fluid return temperature as a function of cycle frequency, and the speed of one or more of cold side fans 66, 68 may be adjusted to drive the measured heat transfer fluid temperature returning from cold side heat exchanger 32 from temperature sensor 86 towards the desired cold side fluid return temperature. Thus, the current cycle frequency may be plugged into the model to calculate the desired cold side fluid return temperature, and controller 80 may adjust the speed of one or more of cold side fans 66, 68 to drive the measured heat transfer fluid temperature returning from cold side heat exchanger 32 from temperature sensor 86 towards the desired cold side fluid return temperature in order to maintain the return temperature of the heat transfer fluid from cold side heat exchanger 32 at an optimal efficiency point. Alternatively, a lookup table of maximal efficiency cold side fluid return temperature versus cycle frequency may be used to determine the desired cold side fluid return temperature rather than a model, such as a continuous linear model of the desired cold side fluid return temperature.

Utilizing method 400, a lift within cold side heat exchanger 32 and/or hot side heat exchanger 34 may be essentially constant before and after changing the cycle frequency at 410. As used herein, the term "essentially" means that the lift changes by less than ten percent. In addition, the term "lift" corresponds to the difference between air temperature and liquid temperature in heat exchangers. Thus, the lift within cold side heat exchanger 32 corresponds to the difference between the temperature of air about cold side heat exchanger 32 and the temperature of heat transfer fluid within cold side heat exchanger 32, and the lift within hot side heat exchanger 34 corresponds to the difference between the temperature of air about hot side heat exchanger 34 and the temperature of heat transfer fluid within hot side heat exchanger 34. As may be seen from the above, method 400 may modify fan speeds to control return fluid temperatures from heat exchangers to thereby maximize efficiency at various operating frequencies despite changing the load on heat pump 100.

Figure 5:
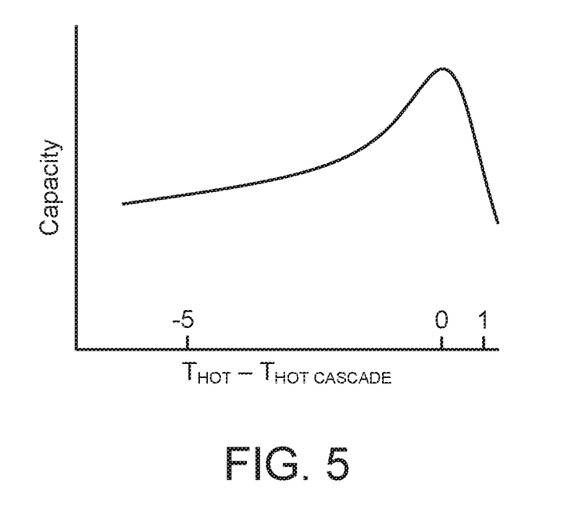
FIGS. 5 and 6 are plots of stage midpoint temperature versus capacity of a heat pump system according to example embodiments of the present subject matter.
Figure 6:
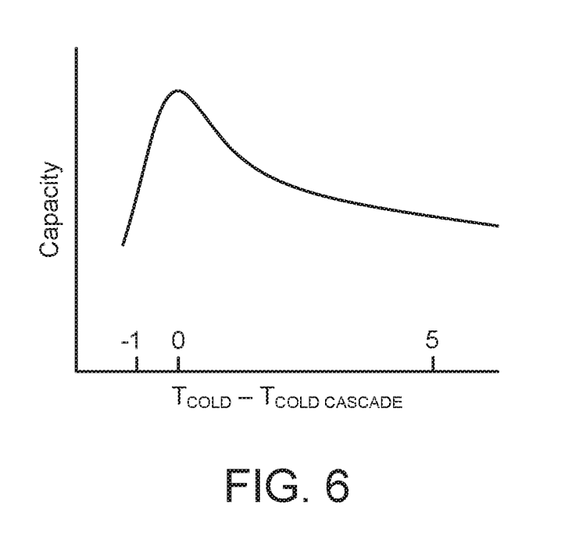

FIG. 5 is a plot of a difference between a temperature of heat transfer fluid returning from hot side heat exchanger 34 and a midpoint temperature of caloric material in a hottest regenerator stage within heat pump 100. FIG. 6 is a plot of a difference between a temperature of heat transfer fluid returning from cold side heat exchanger 32 and a midpoint temperature of caloric material in a coldest regenerator stage within heat pump 100. The midpoint temperature may be defined as the difference between the temperature change in the caloric material when the caloric material is in field versus when the caloric material is out of field. As shown in FIGS. 5 and 6, a cooling capacity of heat pump 100 may be maximized when the difference between a temperature of returning heat transfer fluid and a midpoint temperature of caloric material is zero. Method 400 may include adjusting the speed of fans 36, 66, 68 such that the difference between the temperature of returning heat transfer fluid and the midpoint temperature of caloric material is driven towards zero.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a caloric heat pump system, comprising:
   changing a cycle frequency at which a field of a field generator is applied to caloric material in the caloric heat pump system;
   adjusting a speed of a hot side fan in response to the cycle frequency change, the hot side fan operable to flow air over a hot side heat exchanger of the caloric heat pump system; and
   adjusting a speed of a cold side fan in response to the cycle frequency change, the cold side fan operable to flow air over a cold side heat exchanger of the caloric heat pump system,
   wherein a respective one of three separate control loops changes the cycle frequency, adjusts the speed of the hot side fan, and adjusts the speed of the cold side fan.

2. The method of claim 1, wherein adjusting the speed of the hot side fan in response to the cycle frequency change comprises adjusting the speed of the hot side fan in order to reduce a difference between a temperature of heat transfer fluid returning from the hot side heat exchanger and a midpoint temperature of the caloric material in a hottest regenerator stage.

3. The method of claim 1, wherein adjusting the speed of the cold side fan in response to the cycle frequency change comprises adjusting the speed of the cold side fan in order to reduce a difference between a temperature of heat transfer fluid returning from the cold side heat exchanger and a midpoint temperature of the caloric material in a coldest regenerator stage.

4. The method of claim 1, further comprising measuring an air temperature proximate the hot side heat exchanger, wherein adjusting the speed of the hot side fan in response to the cycle frequency change comprises adjusting the speed of the hot side fan to the speed calculated from a model of maximal efficiency fan speed as a function of cycle frequency and air temperature proximate the hot side heat exchanger.

5. The method of claim 1, further comprising measuring an air temperature proximate the hot side heat exchanger, wherein adjusting the speed of the hot side fan in response to the cycle frequency change comprises adjusting the speed of the hot side fan to the speed selected from a lookup table of maximal efficiency fan speed versus cycle frequency and air temperature proximate the hot side heat exchanger.

6. The method of claim 1, further comprising measuring an air temperature proximate the cold side heat exchanger, wherein adjusting the speed of the cold side fan in response to the cycle frequency change comprises adjusting the speed of the cold side fan to the speed calculated from a model of maximal efficiency fan speed as a function of cycle frequency and air temperature proximate the cold side heat exchanger.

7. The method of claim 1, further comprising measuring an air temperature proximate the cold side heat exchanger, wherein adjusting the speed of the cold side fan in response to the cycle frequency change comprises adjusting the speed of the cold side fan the speed selected from a lookup table of maximal efficiency fan speed versus cycle frequency and air temperature proximate the cold side heat exchanger.

8. The method of claim 1, further comprising measuring a temperature of heat transfer fluid returning from the hot side heat exchanger, and calculating a desired hot side fluid return temperature from a model of maximal efficiency hot side fluid return temperature as a function of cycle frequency, wherein adjusting the speed of the hot side fan in response to the cycle frequency change comprises adjusting the speed of the hot side fan to drive the measured temperature of heat transfer fluid returning from the hot side heat exchanger towards the desired hot side fluid return temperature.

9. The method of claim 1, further comprising measuring a temperature of heat transfer fluid returning from the hot side heat exchanger, and selecting a desired hot side fluid return temperature from a lookup table of maximal efficiency hot side fluid return temperature versus cycle frequency, wherein adjusting the speed of the hot side fan in response to the cycle frequency change comprises adjusting the speed of the hot side fan to drive the measured temperature of heat transfer fluid returning from the hot side heat exchanger towards the desired hot side fluid return temperature.

10. The method of claim 1, further comprising measuring a temperature of heat transfer fluid returning from the cold side heat exchanger, and calculating a desired cold side fluid return temperature from a model of maximal efficiency cold side fluid return temperature as a function of cycle frequency, wherein adjusting the speed of the cold side fan in response to the cycle frequency change comprises adjusting the speed of the cold side fan to drive the measured temperature of heat transfer fluid returning from the cold side heat exchanger towards the desired cold side fluid return temperature.

11. The method of claim 1, further comprising measuring a temperature of heat transfer fluid returning from the cold side heat exchanger, and selecting a desired cold side fluid return temperature from a lookup table of maximal efficiency cold side fluid return temperature versus cycle frequency, wherein adjusting the speed of the cold side fan in response to the cycle frequency change comprises adjusting the speed of the cold side fan to drive the measured temperature of heat transfer fluid returning from the cold side heat exchanger towards the desired cold side fluid return temperature.

12. The method of claim 11, wherein changing the cycle frequency comprises changing the cycle frequency based on a difference between a set temperature and a measured air temperature proximate the cold side heat exchanger.

13. The method of claim 11, wherein a lift within the cold side heat exchanger is essentially constant before and after changing the cycle frequency.

14. The method of claim 11, wherein a lift within the hot side heat exchanger is essentially constant before and after changing the cycle frequency.

15. The method of claim 1, wherein changing the cycle frequency comprises changing the cycle frequency based on a required load for the cold side heat exchanger.

16. A method for operating a caloric heat pump system, comprising:
   changing a cycle frequency at which a field of a field generator is applied to caloric material in the caloric heat pump system;
   adjusting a speed of a hot side fan in response to the cycle frequency change such that a lift within the hot side heat exchanger is essentially constant before and after changing the cycle frequency, the hot side fan operable to flow air over a hot side heat exchanger of the caloric heat pump system; and
   adjusting a speed of a cold side fan in response to the cycle frequency change such that a lift within the cold side heat exchanger is essentially constant before and after changing the cycle frequency, the cold side fan operable to flow air over a cold side heat exchanger of the caloric heat pump system,
   wherein a respective one of three separate control loops changes the cycle frequency, adjusts the speed of the hot side fan, and adjusts the speed of the cold side fan.

17. The method of claim 16, wherein changing the cycle frequency comprises changing the cycle frequency based on a required load for the cold side heat exchanger.

18. The method of claim 16, further comprising:
   measuring a temperature of heat transfer fluid returning from the hot side heat exchanger;
   calculating a desired hot side fluid return temperature from a model of maximal efficiency hot side fluid return temperature as a function of cycle frequency;
   measuring a temperature of heat transfer fluid returning from the cold side heat exchanger; and
   calculating a desired cold side fluid return temperature from a model of maximal efficiency cold side fluid return temperature as a function of cycle frequency,
   wherein adjusting the speed of the hot side fan in response to the cycle frequency change comprises adjusting the speed of the hot side fan to drive the measured temperature of heat transfer fluid returning from the hot side heat exchanger towards the desired hot side fluid return temperature, and adjusting the speed of the cold side fan in response to the cycle frequency change comprises adjusting the speed of the cold side fan to drive the measured temperature of heat transfer fluid returning from the cold side heat exchanger towards the desired cold side fluid return temperature.

19. The method of claim 16, further comprising:
   measuring a temperature of heat transfer fluid returning from the hot side heat exchanger;
   selecting a desired hot side fluid return temperature from a lookup table of maximal efficiency hot side fluid return temperature versus cycle frequency;
   measuring a temperature of heat transfer fluid returning from the cold side heat exchanger; and
   selecting a desired cold side fluid return temperature from a lookup table of maximal efficiency cold side fluid return temperature versus cycle frequency,
   wherein adjusting the speed of the hot side fan in response to the cycle frequency change comprises adjusting the speed of the hot side fan to drive the measured temperature of heat transfer fluid returning from the hot side heat exchanger towards the desired hot side fluid return temperature, and adjusting the speed of the cold side fan in response to the cycle frequency change comprises adjusting the speed of the cold side fan to drive the measured temperature of heat transfer fluid returning from the cold side heat exchanger towards the desired cold side fluid return temperature.

* * * * *